US010430755B2

(12) United States Patent
Aji

(10) Patent No.: US 10,430,755 B2
(45) Date of Patent: Oct. 1, 2019

(54) INVENTORY MANAGEMENT DEVICE

(71) Applicant: Adhithi Venkatesh Aji, Pittsburgh, PA (US)

(72) Inventor: Adhithi Venkatesh Aji, Pittsburgh, PA (US)

( * ) Notice: Subject to any disclaimer, the term of this patent is extended or adjusted under 35 U.S.C. 154(b) by 317 days.

(21) Appl. No.: 15/370,933

(22) Filed: Dec. 6, 2016

(65) Prior Publication Data

US 2017/0161676 A1  Jun. 8, 2017

Related U.S. Application Data

(60) Provisional application No. 62/263,688, filed on Dec. 6, 2015.

(51) Int. Cl.
*G06Q 10/08*  (2012.01)

(52) U.S. Cl.
CPC .................. *G06Q 10/087* (2013.01)

(58) Field of Classification Search
CPC ...... G06Q 10/08; G06Q 10/087; G01F 17/00; B67D 1/1238
USPC .......... 705/28; 73/149, 290 V, 290 R, 304 C, 73/579, 780; 324/207.13
See application file for complete search history.

(56) References Cited

U.S. PATENT DOCUMENTS

| | | | | |
|---|---|---|---|---|
| 4,091,250 A * | 5/1978 | Siiberg | ..................... | G01F 23/74 200/84 C |
| 5,074,148 A * | 12/1991 | Lew | ..................... | G01F 23/2966 73/290 V |
| 5,528,933 A * | 6/1996 | Nemirow | ................ | G01F 17/00 73/149 |
| 5,743,134 A * | 4/1998 | Dreyer | ................ | G01F 23/2967 73/1.81 |
| 5,763,961 A * | 6/1998 | Dreyer | ................... | H03K 17/94 307/116 |
| 6,047,598 A * | 4/2000 | Otto | ..................... | G01F 23/284 340/621 |

(Continued)

FOREIGN PATENT DOCUMENTS

| | | |
|---|---|---|
| DE | 102010030362 A1 | 12/2011 |
| DE | 102013107707 A1 | 1/2015 |

(Continued)

*Primary Examiner* — Andrew Joseph Rudy
(74) *Attorney, Agent, or Firm* — Cohen & Grigsby, P.C.

(57) ABSTRACT

An inventory management device to monitor a volume of a material in a container may generally include a capacitive level sensor to measure a first capacitance value and a second capacitance value; a vibration sensor in electronic communication with the capacitive level sensor to generate a vibration signal that corresponds to a vibration of the container; a storage unit in electronic communication with the capacitive level sensor to store the first capacitance value; a controller in electronic communication with the capacitive level sensor and storage unit to measure a change in the capacitance between the first capacitance value and second capacitance value; a transmitter in electronic communication with the controller to transmit an output signal when the controller measures the change in capacitance; and a flexible battery to power the capacitive level sensor, vibration sensor, storage unit, controller, and transmitter.

13 Claims, 7 Drawing Sheets

(56) References Cited

U.S. PATENT DOCUMENTS

| | | | |
|---|---|---|---|
| 7,536,255 B2* | 5/2009 | Otsuki | G05B 19/042 235/375 |
| 7,775,130 B2* | 8/2010 | Harish | G06Q 10/087 73/780 |
| 8,037,753 B2* | 10/2011 | Fehrenbach | G01D 5/54 73/290 R |
| 8,418,550 B2* | 4/2013 | Hampton | G01F 23/265 73/290 R |
| 8,448,509 B2* | 5/2013 | Elofsson | G01F 23/2965 73/290 V |
| 9,032,865 B2* | 5/2015 | Carbonini | A47J 31/56 99/279 |
| 9,084,075 B2* | 7/2015 | Farley | H04L 67/12 |
| 9,506,798 B2* | 11/2016 | Saltzgiver | G01F 23/263 |
| 9,658,095 B2* | 5/2017 | Winkens | G01F 23/266 |
| 2005/0154598 A1* | 7/2005 | Kanayama | G06Q 20/102 705/400 |
| 2006/0012464 A1 | 1/2006 | Harish et al. | |
| 2009/0114041 A1 | 5/2009 | Nitzan et al. | |
| 2013/0332323 A1 | 12/2013 | Phillips et al. | |
| 2015/0326795 A1 | 11/2015 | Bashkin et al. | |

FOREIGN PATENT DOCUMENTS

| | | |
|---|---|---|
| EP | 2124018 | 11/2009 |
| WO | 2015/153768 A1 | 10/2015 |

\* cited by examiner

Figure 3: Use case for Pocket-size Inventory System

Figure 4: Block Diagram of the Pocket-size Inventory System

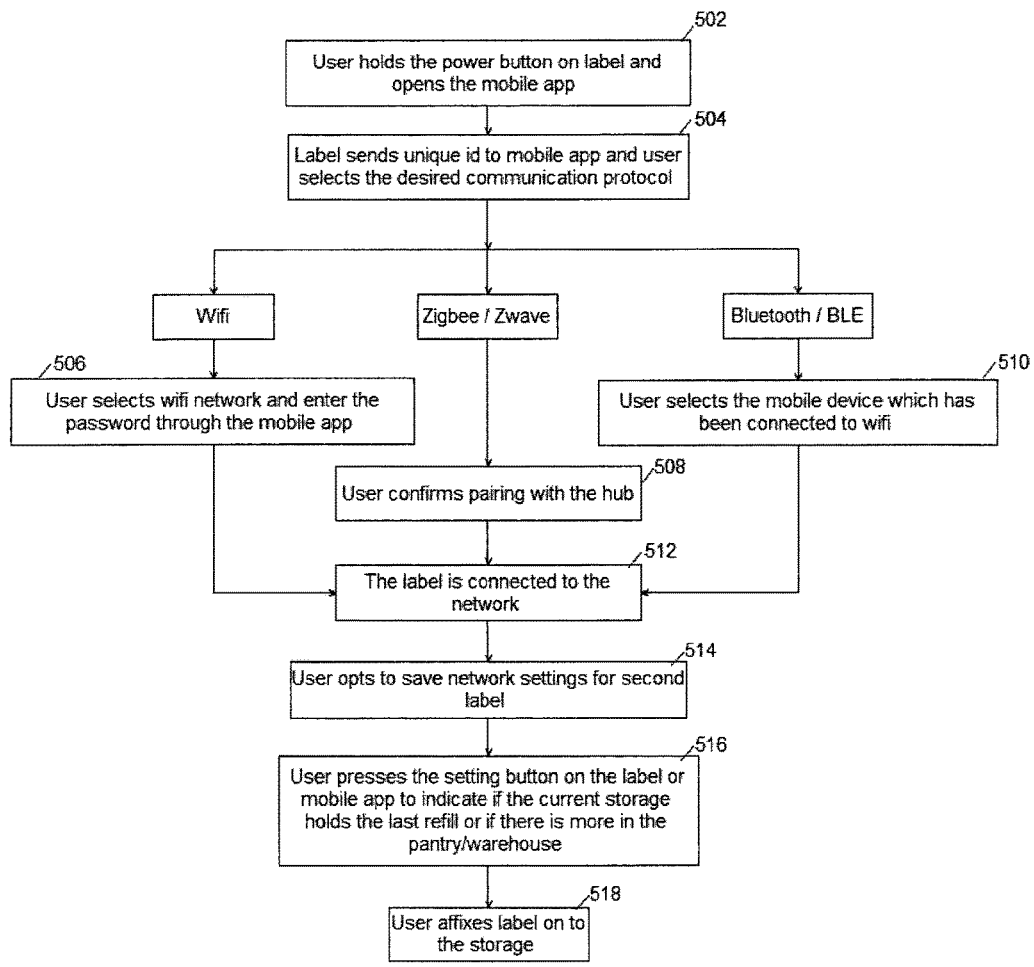

Figure 6A: Viewing all storages having the label:
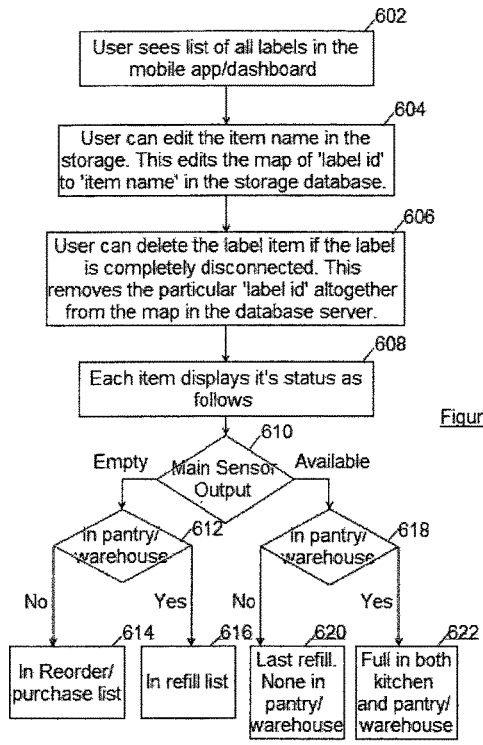
Figure 6B: Viewing all storages that need reordering/purchasing:
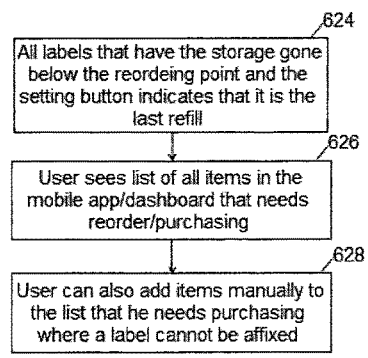
Figure 6C: Viewing all storages that need refill from pantry/warehouse:
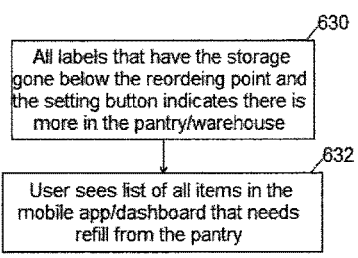
Figure 6D: Additional feature set 1 in the mobile app/dashboard:
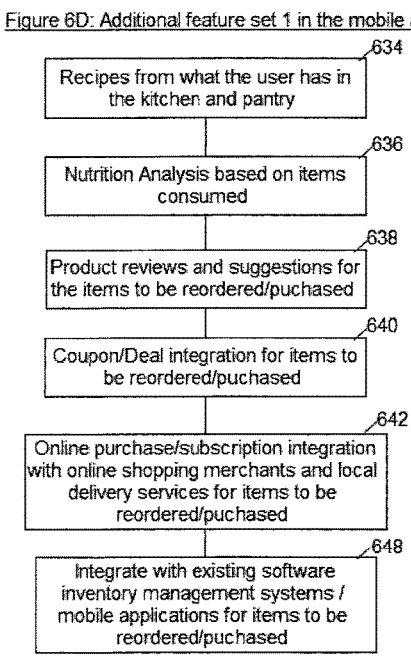
Figure 6E: Additional feature set 2 in the mobile app/dashboard:
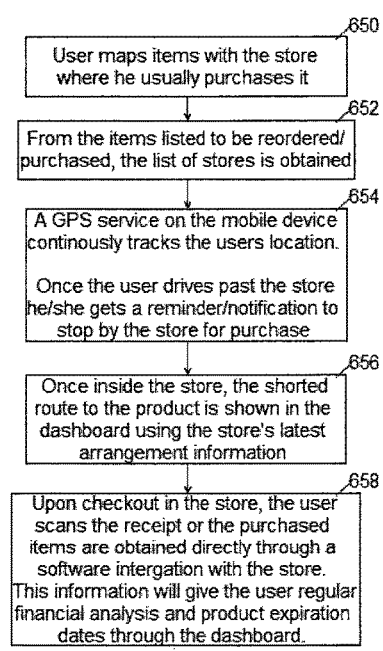

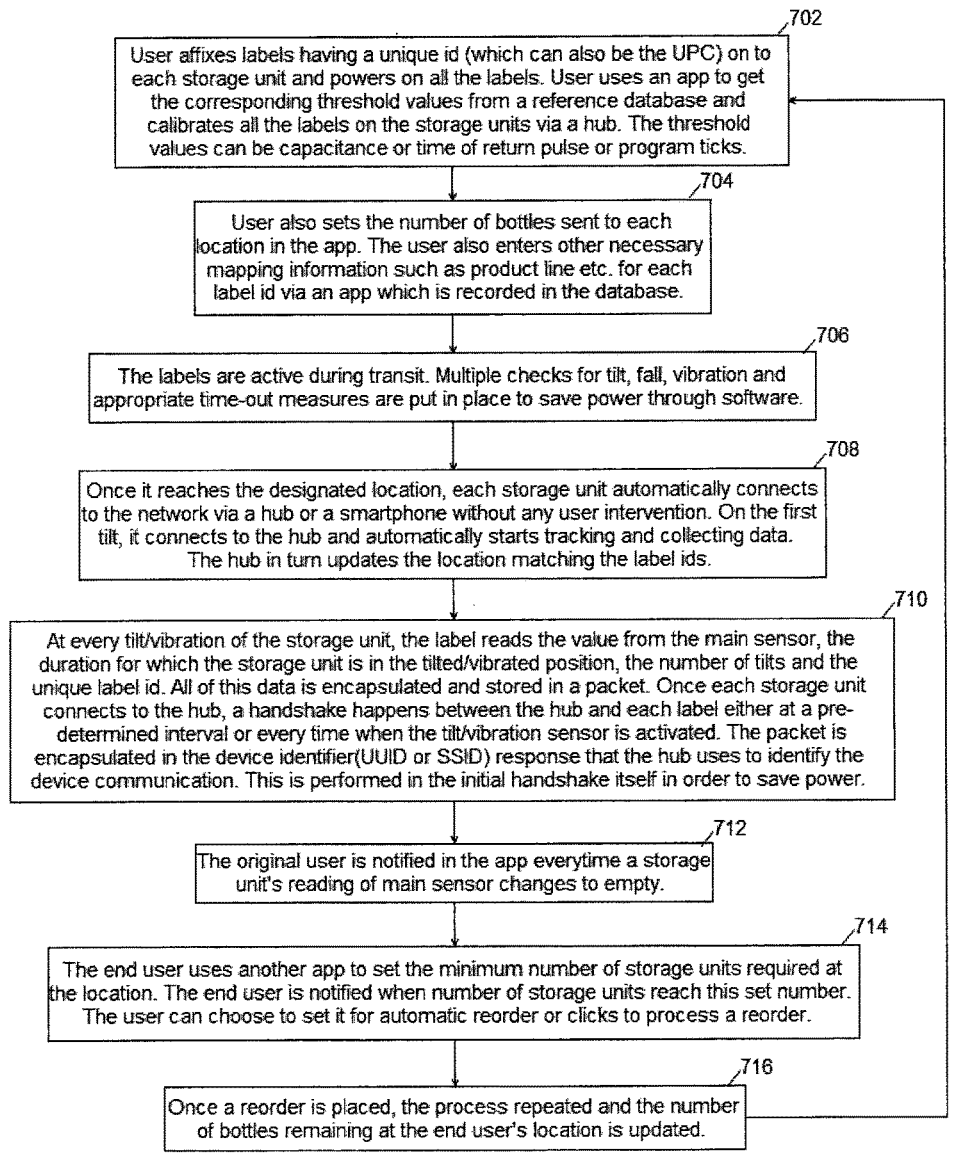
Figure 7: Configuration and usage of disposable labels:

INVENTORY MANAGEMENT DEVICE

CROSS-REFERENCE TO RELATED APPLICATION

This application claims priority to U.S. provisional application Ser. No. 62/263,688, filed on Dec. 6, 2015, which is hereby incorporated by reference in its entirety.

BACKGROUND

This invention relates to an inventory management system, and more particularly to systems and methods of measuring levels or quantities of substances in containers.

In general, conventional inventory management systems and methods are labor intensive and time consuming. For example, a user may have to visually inspect the container to determine the level or quantity of the substance in the container and/or whether the container needs replenishment. Replenishments are ordered manually. In addition, conventional inventory management systems may use special containers that are expensive to manufacture and too large for certain applications. Accordingly, more efficient and/or cost-effective inventory management systems and methods of making and using the same are desirable.

SUMMARY

The inventory management system may be characterized by a pocketsize, portable, automated inventory management device that may be reusable and surmountable to a non-metallic container of any size or shape to measure, monitor, and reorder the material when the quantity or level of material in the container is equal to or less than the reorder point ("ROP").

The inventory management system may be programmed to integrate into conventional inventory management software and/or point of sales software. The inventory management system may provide a more simple method of monitoring inventory relative to conventional inventory management systems.

The inventory management system may be programmed to remotely monitor the quantity or level of material in the container and reorder the material when such quantity or level is equal to or less than the desired reordering point set by the user. The inventory management system may be programmed to conserve power by intermittently powering the inventory management device.

The inventory management device may be attached to any non-metallic container. The inventory management device may be agnostic to the container's shape and size. The inventory management system may be nonintrusive such that the inventory management device may attach to an external surface of the container and not contact the material therein. The inventory management device may comprise a small, thin, reusable electronic sticker. The inventory management device may comprise an active battery that does not require recharging.

An inventory management device to monitor a volume of a material in a container may generally comprise a capacitive level sensor to measure a first capacitance value of the material in the container and a second capacitance value; a storage unit in electronic communication with the capacitive level sensor to store the first capacitance value; a controller in electronic communication with the capacitive level sensor and storage unit to measure a change in the capacitance between the first capacitance value and second capacitance value; a transmitter in electronic communication with the controller to transmit an output signal when the controller measures the change in capacitance; a battery to power the capacitive level sensor, storage unit, controller, and transmitter; and a vibration sensor in electronic communication with the battery and capacitive level sensor to generate a vibration signal that corresponds to a vibration of the container.

DESCRIPTION OF THE DRAWINGS

The various embodiments described herein may be better understood by considering the following description in conjunction with the accompanying drawings.

FIG. 5 includes a flow chart illustrating a method of inventory management.

FIGS. 6A-6E include flow charts illustrating methods of inventory management.

FIG. 7 includes a flow chart illustrating a method of inventory management.

DESCRIPTION

Figure 1:
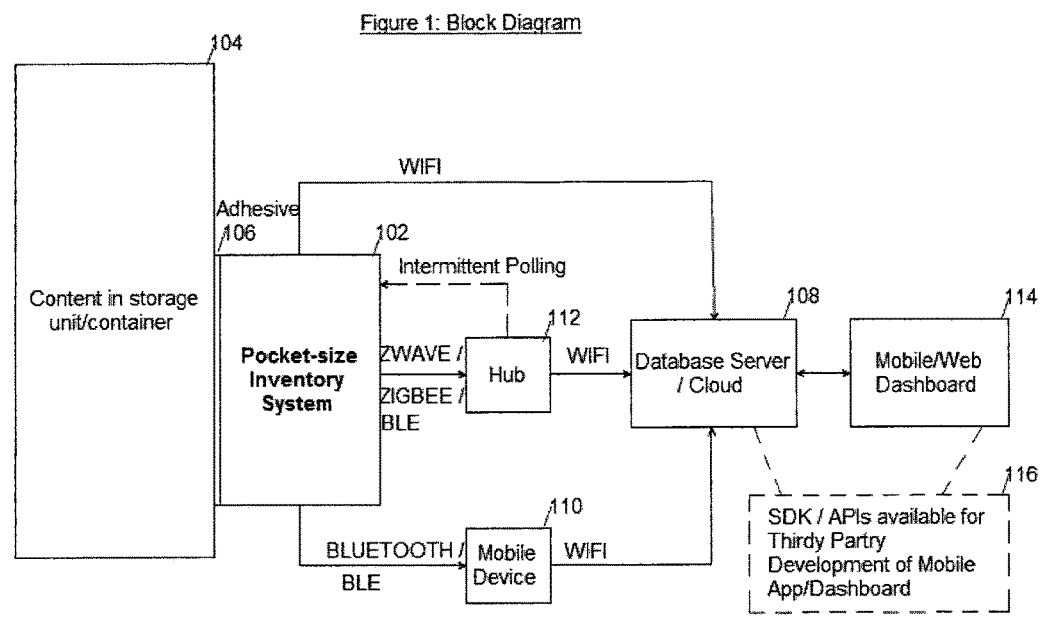
FIG. 1 includes a block diagram of an inventory management system.

As generally used herein, the articles "one", "a", "an" and "the" refer to "at least one" or "one or more", unless otherwise indicated.

As generally used herein, the terms "including" and "having" mean "comprising".

In the following description, certain details are set forth in order to provide a better understanding of various aspects of inventory management systems and methods of making and using the same. However, one skilled in the art will understand that these aspects may be practiced without these details and/or in the absence of any details not described herein. In other instances, well-known structures, methods, and/or techniques associated with methods of practicing the various aspects may not be shown or described in detail to avoid unnecessarily obscuring descriptions of other details of the various aspects.

According to various aspects, more efficient and/or cost-effective inventory managements and methods of making and using the same are described.

The inventory management devices and systems may be used by end users, retailers, distributors, and manufacturers of consumer goods to collect, track, and/or process product usage data.

The inventory management devices, sometimes referred to as a label, may be coupled to or embedded in the container for the consumer goods. After the container leaves the manufacturer and/or distributor and travels through the supply chain to the end user, which could be a business entity or a consumer, the label may collect and transmit product data to be displayed via a computer interface, such as a mobile application, web application, and computer. The end user may connect the label to the internet via WIFI, BLUETOOTH, (Bluetooth Low Energy) BLE or any network interface or network hub. The interface may be used by the manufacturer and/or distributor to directly communicate with the retailer and/or end user. The manufacturer and/or distributor may facilitate communications with the retailer and/or end user, such as targeted promotions, recipes, and need based subscription services. The retailer and/or end user may use the interface to reorder the product, provide feedback to the manufacturer and/or distributor, and/or communicate with the manufacturer and/or distributor.

Once the end user connects the label to the network, the inventory management devices and systems may be completely automated to track the amount of material in the container, usage data, including when, where, and how often the product is used, consumer demographics, and when a reorder of the product is desirable. For example, the system may transmit a notification to the end user, retailer, distributor, and manufacturer of the product when the amount of material in the container or a plurality of containers connected to the networks achieves a threshold amount.

The inventory management devices and systems may be used to maximize marketing return on investment ("ROI"). For example, conventional promotions may be publically broadcasted. This approach may be less effective than directing promotions to a targeted audience. The inventory management devices and systems described herein may provide targeted promotions, e.g., coupons and other discounts, via the user interface transmitted to the consumer at the exact time when the consumer is in the market for the product, e.g., reordering the product, because the manufacturer and/or distribution may know when the consumer needs to reorder the product.

The inventory management devices and systems may be used for new product testing. Conventional systems and methods used by manufacturers and distributors to test new product concepts may be problematic. The results from the self-selected consumers may be biased. The self-selected consumers may have to manually input the activity tracking information, which may result in human error and, ultimately, suboptimal decisions in positioning and marketing of the product. The inventory management devices and systems described herein may facilitate automated testing and/or collection of product usage data with minimal or no human intervention, and/or randomized sampling. The inventory management devices and systems described herein may facilitate testing multiple product concepts to determine the most profitable and/or desirable product to go into production. The testing results obtained using the inventory management devices and systems described herein may be less biased and/or unbiased relative to conventional methods to provide a faster time to market and better success rate in new product launches.

The inventory management devices and systems may be used to optimize production planning based on seasonality of product. Manufacturers, distributors, and retailers of consumer goods may face the challenge of changing consumer demand and seasonality of product usage leading to overproduction or understocking. The product usage data collected, processed, and transmitted by the inventory management devices and system may be used to determine the seasonality of a product to optimize production.

The inventory management devices and systems may be used to optimize stocking of a product or group of products. Retail sales data may be different from actual consumption data. This may lead to lost sales when the retail sales data is less than the actual consumption data or unused inventory when the retail sales data is greater than the actual consumption data. The product usage data collected, processed, and transmitted by the inventory management devices and system may be used to identify consumption patterns for a product for a specific location or geographic area, such as within a city, and thereby the optimum stocking level of the product at each retail store in the geographic area based on usage.

The inventory management devices and systems may be used to facilitate a need based subscription model in which the customer receives the goods/services as needed. Conventional subscription business models generally require a customer to purchase the goods/services at a predetermined frequency, such as every month or week, and thereby, the customer may over purchase or under purchase the goods/services. Conventional subscription business models are generally not based on the need of the customer. Conventional subscription business models may experience a high attrition rate, sometimes referred to as a churn rate. A need based subscription business model may be based on the actual goods/services usage over a certain period of time. As described above, the goods/services usage data collected, processed, and transmitted by the inventory management devices and system may be used to identify consumption patterns to provide for a need based subscription model that allows users to subscribe for the optimum level of the goods/services based on usage.

The inventory management devices and systems described herein may collect, process, and/or transmit product usage data that may be used by manufacturers and distributors of consumer goods to capture the fluctuations in consumer demand, optimize production, measure the effectiveness of targeted promotions, and for competitive benchmarking and onboarding a new location/customer.

An inventory management system may be characterized by a surmountable small pocket-size inventory device having one or more sensors that is flexible and attachable to a container holding a material, for example, dry, granular solids and liquids. The inventory management system may be further characterized by a customizable re-ordering point to automate inventory management of the material and reduce/eliminate manual intervention. The inventory management device may be agnostic to the size and shape of the container. The inventory management device may comprise a power saving circuit to allow continued usage of the device without the need to recharge the battery.

The inventory management system may be characterized by one or more of the following, as described in more detail below: (1) a unique identifier, such as a UPC code or a media access control address (MAC address), for each device to collect when, where, how often and when each container achieves the threshold amount, (2) collect consumption data, including the rate of consumption and when the amount of material in the container achieves a ROP; (3) comprise a tilt detection sensor, e.g., an accelerometer or gyroscope or a tilt switch, to measure a tilt of the container when the container is caused to move into a sloping position; (4) measure the time period of each tilt; (5) determine the total number of tilts by calculating the duration of each tilt and the total number of tilts; (6) determine the amount of material in the container; (7) using BLUETOOTH or BLE (Bluetooth Low Energy) to collect product usage information while scanning, i.e., instead of transmitting the identifier for each device, it sends out a unique string with status encapsulated that serves as the device identifier; detects when the container is opened; (8) automatically connects to the network; (9) after detecting a tilt, the device may measure the capacitance of the contents or lack thereof in the container and transmit the capacitance value to a database and/or store the capacitance value in a store unit to be transmitted at a later time, such as when the amount of material in the container achieves a threshold level; (10) calibrating the device through software based on the material in the container; (11) having a minimally intrusive design and applicability to conventional manufacturing processes with minimal redesign of such manufacturing processes; (12) an active battery having narrow thickness such that it may be embedded in the label coupled to the container; (13) a battery that may be active through transit and configured to maintain power using intelligent power saving modes; (14) automatic data collection, processing, and communication, e.g., when the end user activates the device, it may automatically connect to a hub and automatically begin collecting product usage data when a vibration is detected, and/or the hub may advertise at any period of time desired by the user, e.g., 1 hour, and/or when all or substantially all tilts are detected, to wake up the device and begin collecting and/or transmitting the product usage data; and (15) collecting the product usage data during the advertising itself, e.g., the handshake signal may transmit the packet with the data of unique identification, status, number of pours, and time of each pour.

Referring to FIG. 1, an inventory management device 102 may attach to a container 104. The container 104 may be used to store materials that reach a stable state and present a clear level to measure when stored in the container 104. Examples of these materials include, but are not limited to, a dry solid, semi-solid, viscous, lubricant, solids, liquid, powder, granular material. The container 104 may comprise an adhesive 106 at a customizable reordering point desired by the user. The reorder point ("ROP") is the amount of material that triggers an action to replenish that particular material. The inventory management device may comprise at least one sensor to measure the quantity of the amount of the material in the container. The inventory management device may comprise a transmitter to transmit the measured value to a server 108 in a remote location. The sensor may transmit the measured value to the server 108 by WIFI. The transmitter may comprise a BLUETOOTH or a BLE (Bluetooth low energy) transmitter to communicate to a mobile device 110. The mobile device 110 may act as a modem to communicate with the server 108. The transmitter may comprise a low-power wireless local area network to communicate through a hub 112 with the server 108. The low power communication protocol may comprise ZIGBEE/ZWAVE. The server 108 may comprise software to provide two way communication with a dashboard 114. The dashboard 114 may comprise a web or mobile application. Additionally, the software may comprise a software development kit 116 including an application program interface to develop any third party software tools.

Figure 2:
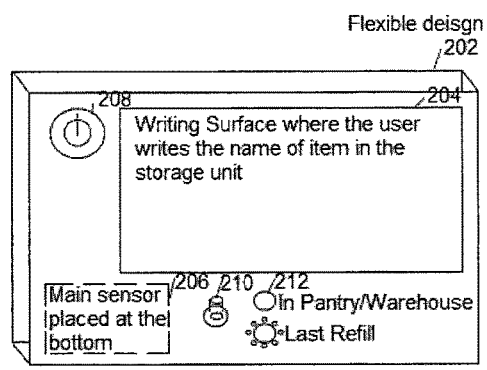
FIG. 2 includes a perspective view showing an inventory management device.

Referring to FIG. 2, the inventory management device may comprise a label that may be attached to the container. The inventory management device may comprise a flexible, reusable, non-intrusive device that may be surmounted to the external surface of the container 104. The inventory management device 202 may comprise a label 204 having a writing surface for the user to identify the contents of container. The inventory management device may be agnostic to the size and shape of the container 104.

Figure 4A:
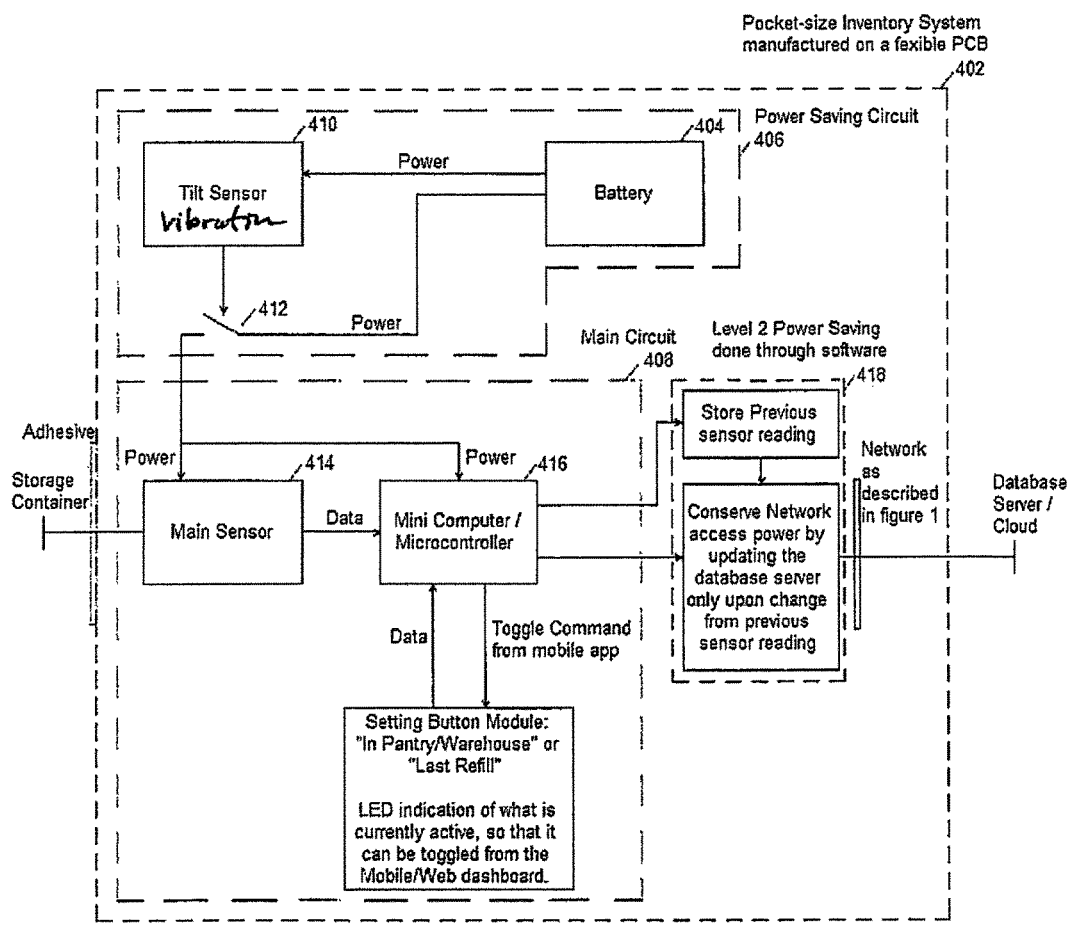
FIGS. 4A and 4B include a block diagram of an inventory management system.
Figure 4B:
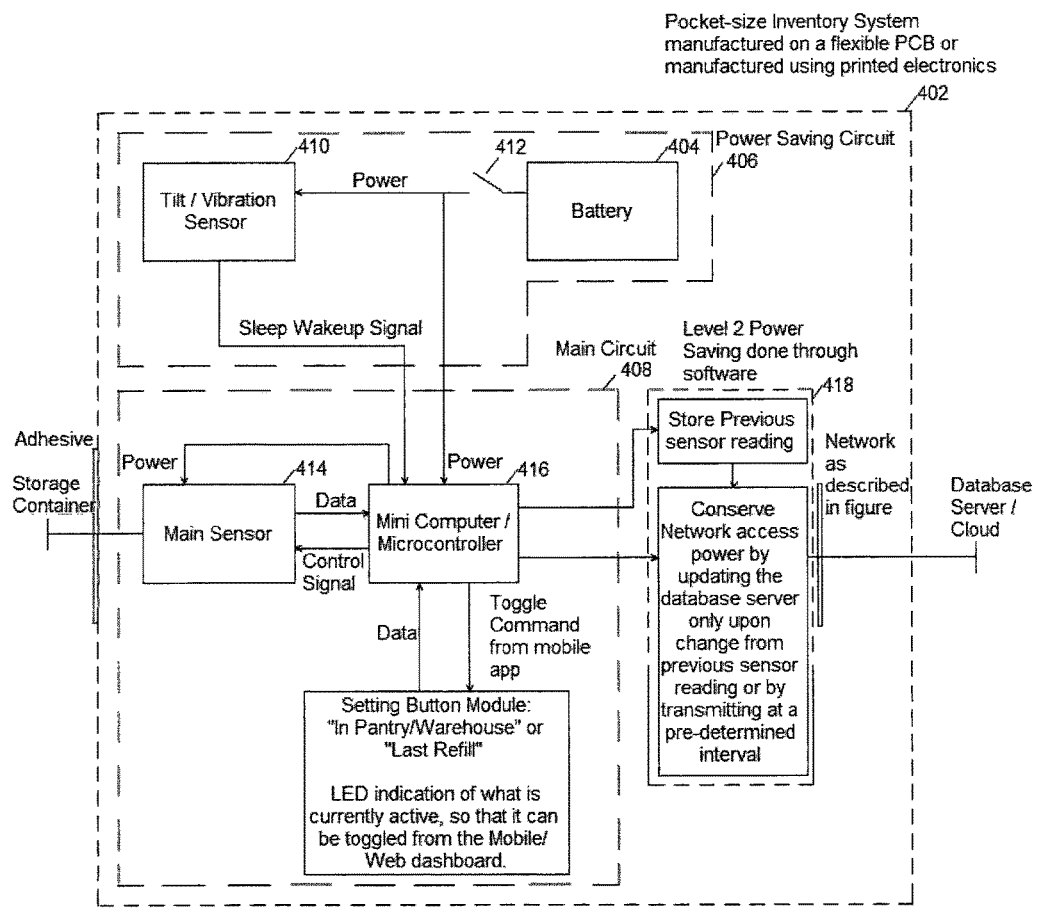

Referring to FIGS. 4A and 4B, the inventory management device may comprise a power saving circuit to minimize power consumed such that the user may not need to recharge the battery during use. The power saving circuit, and thereby power consumption, may be related to the tilting or vibration of the container.

The inventory management device may be characterized by the following dimensions: up to 200 mm high, such as 1-200 mm, and 50-127 mm, up to 200 mm wide, such as 1-200 mm, and 50-127 mm, and up to 50 mm thick, such as 0.1-50 mm. The inventory management device may comprise other shapes and dimensions as desired.

The inventory management device may comprise at least one sensor, such as a level sensor 206 and a vibration sensor 410. Referring to FIGS. 4A and 4B, the power saving unit may comprise a level sensor 206. The level sensor 206 may be positioned at the bottom of the inventory management device to allow the user to set the ROP by aligning the sensor to the desired ROP The level sensor may comprise one or more of a magnetic float level sensor, a mechanical float level sensor, a pneumatic level sensor, a conductive level sensor, an ultrasonic level sensor, a capacitance level sensor, an inductive proximity sensor, an optical sensor, a microwave sensor, magnetostrictive level sensor, resistive chain level sensor, magnetoresistance float level sensor, hydrostatic pressure level sensor, an air bubbler system, and a nuclear level gauge, such as a gamma ray gauge, or any other sensor configured to detect a change in a physical characteristic related to the amount of material inside the container.

When the user attaches the inventory management device 102 to the container 104, turns on the power button 208 and maps the quantity or level of the material in the container to a dashboard 114, which may run on a mobile device or a computer, and configures the inventory management device to a wireless communication protocol, the dashboard 114 may notify the user when the quantity or level of the material reaches or falls below the ROP. After receiving the notification, as shown in FIG. 1, the user may manually reorder a replenishment amount to achieve a desired quantity or level of the material, or the inventory management system may be programmed to automatically reorder the replenishment amount. The inventory management device may integrate with conventional inventory management software, as illustrated in FIG. 6.

The inventory management device 102 may comprise a switch/setting button 210 to toggle LED 212 to allow the user to receive a replenishment notification when the last refill when locally stored stock of the material, such as in a pantry or cabinet in a household application or store room in other small businesses, is at or below the ROP, or is absent. Instead of reordering the material, the user may receive a notification to refill the container with material from a local larger storage container. The LED 212 may be changed through the dashboard 114. The inventory management device 102 may provide a two-step inventory process where the user may be provided with a list of materials that may be refilled from local supplies and a list of materials that may be to be reordered.

In use, the inventory management system may automatically monitor the quantity or level of material in the container, collect and record inventory information or data, and reorder material with minimal or no manual intervention. The inventory management system may provide the user with real time inventory information and access to such inventory information. The inventory information may comprise a timestamp including the date, hour, minute, and second of each use of the container or each vibration, and when the material achieves the ROP, demographics of the user, frequency of use of the container, location of the container, number of containers connected to the network having an amount greater than the threshold amount and/or an amount equal to or less than the threshold amount, weather, geography, and events, for example. The inventory information may be stored in a storage unit and transmitted to a database when the ROP is achieved.

The inventory management system may be modular and configured to integrate with any other third party inventory management hardware and software (e.g., software development kit, "SDK") 116.

Figure 3:
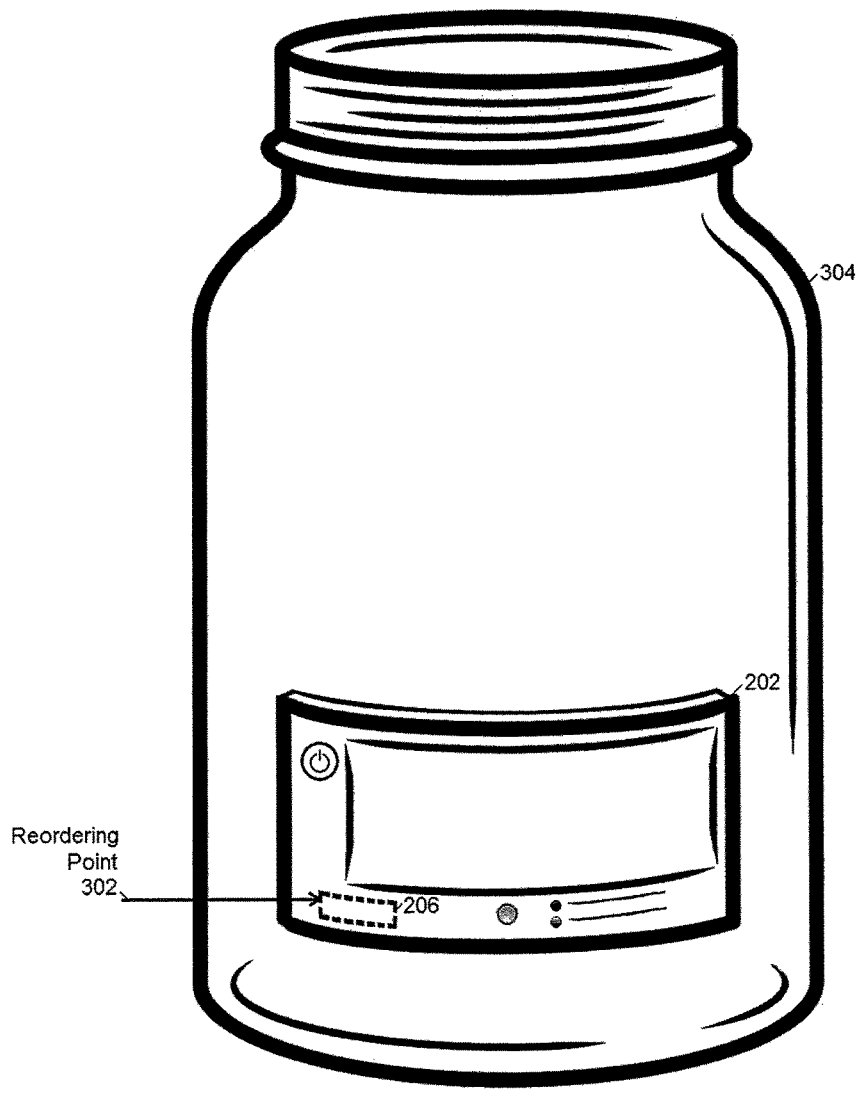
FIG. 3 includes a front view of an inventory management system having a replenishment threshold.

FIG. 3 illustrates a front view of an inventory management system having a replenishment threshold. The user may use the inventory management device to set the ROP and collect and monitor the quantity or level of the material in the container.

The inventory management device may be positioned on an outer surface of the container. The bottom of the inventory management device may set the ROP 302 or the amount when the user desires to be notified about the quantity or level of the material in the container. The level sensor 206 may be positioned at the bottom of the inventory management device. Therefore, the user may customize the ROP 302 according to the user's minimum inventory needs or safety stock by adjusting the position of the inventory management device.

The container may comprise a jar 304 used in household applications. The inventory management device may be surmounted on any container notwithstanding the shape or size of the container.

FIG. 4A includes a block diagram of an inventory management system. The inventory management device 102 may comprise a flexible printed circuit board (PCB) or printed electronics 402. The power module may comprise a battery 404 to power the main circuit 408 and a power saving circuit 406 and. The power saving circuit 406 may comprise a vibration sensor 410, such as a tilt sensor, directly connected to the battery 404. The tilt sensor may detect a tilt when the container is caused to move into a sloping position, such as greater than 0°, up to 180°, greater than 0° up to 90°, 15-30°, 15-45°, 15-90°, 30-90°, 90-180°, 45°, 60°, and 90°. The switch 412 may connect the battery 404 to the vibration sensor 410 and main circuit when closed. The vibration sensor 410 may be constantly powered on when the switch 412 is closed. The vibration sensor 410 may control the main circuit 408 by transmitting a wakeup signal interrupt to the controller. The controller may be programmed to control the sensitivity of vibration sensor 410 by regulating the voltage. When the vibration sensor 410 detects a vibration, the controller may be programmed turn on the main circuit 408.

FIG. 4B includes a block diagram of an inventory management system. The inventory management device 102 may comprise a flexible printed circuit board (PCB) or printed electronics 402. The power module may comprise a battery 404 to power the main circuit 408 and a power saving circuit 406. The power saving circuit 406 may comprise a vibration sensor 410, such as a tilt sensor, connected to the battery 404 via a switch 412. When the user power on the device 102, the switch 412 closes to connect the battery 404 to the power saving circuit and the main circuit. When the vibration sensor 410 detects a vibration, the controller may be programmed to transmit a signal, e.g., sleep wakeup signal, to the main circuit 408 to turn on the main circuit 408. The controller may be programmed to control the sensitivity of vibration sensor 410 by regulating the voltage.

The vibration sensor may comprise one of an accelerometer, a tilt sensor, a proximity sensor, a position sensor, and a transducer.

The battery may comprise one of a flexible battery and a printed battery. The battery may or may not be rechargeable. The battery may comprise one of a kinetic energy powered battery, a fuel cell, a thermal power source, a lithium-ion battery, a solar panel connected to a battery, a zinc air battery, a button cell battery, a Tesla coil, a printed battery, a flexible battery, a battery made of organic matter, and an alkaline battery. The battery may be characterized by a low capacity.

The inventory management device may be manufactured using a printed circuit board method including a rigid substrate or flexible substrate, a printed electronic method, a thin-film deposition method, machining, sintering, or any other known or desired method known to a person of ordinary skill in the art. The inventory management device may comprise an array of conductive materials for electrodes bonded to a thin dielectric flexible film on an insulating substrate. Exemplary conductive materials for electrodes include, but are not limited to, copper, silver, gold, aluminum and their alloys, their coatings and inks, or any other desired material or combination of materials known to a person of ordinary skill in the art. Exemplary insulating substrate materials include, but are not limited to, various resin laminates, glasses, ceramics and plastic sheets and tubes, or any other desired material or combination of materials known to a person of ordinary skill in the art.

The controller may be programmed to turn on the main circuit 408. For example, the controller may be programmed to turn on a timer when the first vibration is detected. The timer may comprise a time period sufficient for the material to stabilize or achieve equilibrium after a tilt. The time period may be from at least 1 second up to 1 hour. If another vibration is detected before the timer expires, then the controller may be programmed to reset the timer to start again. The expiration of the timer may indicate that the user stopped using the container. When the timer expires, the controller may be programmed to turn on the main circuit 408.

The main circuit 408 may comprise the main sensor 414, a minicomputer 416 including a wireless module and modem. The main sensor 414 may be connected to the minicomputer 416. The minicomputer 416 may be programmed to control the main sensor 414. Alternative, the main sensor 414 may comprise the minicomputer 416. As described above, the main circuit may be powered on intermittently as determined by the power saving circuit 406. The main sensor 414 may comprise one or more of the capacitive level sensor, vibration sensor, storage unit, controller, and transmitter.

The main sensor 414 and the minicomputer 416 may be connected in series and directly connected to the battery 404. The main sensor 414 may detect the quantity or level of the material in the container. The main sensor 414 may transmit a low voltage signal to the minicomputer 416 when the quantity of material is at or below the ROP.

The main sensor 414 may comprise one of a capacitive level sensor and an ultrasonic sensor. The capacitive level sensor may comprise a capacitive proximity switch. The capacitive level sensor may be characterized as a non-intrusive sensor attached to an outer surface of the container that does not contact the material in the container. The capacitive level sensor may measure a change in capacitance of the material in the container. The capacitive level sensor may comprise two metal plates to generate a circular electromagnetic field. When the material in the container contacts the electromagnetic field, the material acts as a dielectric for the capacitor to change the capacitance. The change in capacitance may be outputted as a voltage signal to the minicomputer as an interrupt signal. The capacitive level sensor may determine the presence or absence of the material at that ROP. The main sensor 414 may comprise a copper strip.

Without wishing to be bound to any particular theory, the capacitance may depend on the composition of material in the container, the composition of the container, and/or the wall thickness of the container. The container may comprise glass, plastic, metal or any other composition suitable to store the material. The capacitance value may comprise one of the capacitance of the container, the capacitance of the container and material contained therein, and the capacitance of the container lacking material container therein.

The minicomputer 416 may receive and process the input value. The minicomputer may be programmed to reduce the power consumption. The minicomputer may store one or more input values. Referring to FIG. 1, the minicomputer may be programmed to send the input valve via the WIFI module to the server 108 when the input value transmitted by the capacitive level sensor is different from the stored input value on the minicomputer 416. The input value may be transmitted to the server using the communication channels as set by the user in the initial setup. The input values may be collected for a desired period of time, and stored in a database, such as server 108, and/or the storage unit. The database may be used to aggregate and correlate inventory information that may be useful in other business applications or business decisions.

The main sensor 414 may use less power to operate compare to conventional inventory management devices because the battery is not always on but turned on intermittently via circuit 2. The inventory management system may communicate with the server only when the signal transmitted by the capacitive level sensor value from is different from the stored valued thereby limiting the usage of and power consumed by the BLUETOOTH, BLE, ZIGBEE/ZWAVE, WIFI module.

Referring to FIGS. 5 and 6, the inventory management system may be used for household inventory management. However, a person having ordinary skill in the art would appreciate that the inventory management system 102 may be used to manage the inventory of liquid vending machines, bakeries, bars, coffee shops, food courts, pharmacies and other applications that may benefit from inventory management of containers of solids, liquids, gases, and gels. The inventory management system may be used in by distilleries, craft distilleries, pharmacies, publishers in the printing industry, cosmetic and perfume industry, and manufacturers of cleaning supplies.

The transmitter may comprise at least one of BLUETOOTH communication, a radio-frequency identification (RFID) communication, a near-field communication (NFC), or a personal area network (PAN) communication to connect to a WIFI or Ethernet communications network or machine-to-machine (M2M) wireless communications network; and ZIGBEE/ZWAVE communication.

FIG. 5 includes a flow chart illustrating the installation and setup of a networked inventory management system. At 502, a user may hold the power button of the inventory management device and access a mobile application. At 504, the inventory management device may transmit a unique identification to the mobile application, and the user may select a desired communication protocol. The communication protocol may comprise WIFI, ZIGBEE/ZWAVE, or BLUETOOTH. The user may select WIFI at 506, for example, and enter a password through the mobile application. At 508, the user may select ZIGBEE/ZWAVE and confirm pairing with the hub. At 510, the user may select BLUETOOTH and a mobile device that is connected to WIFI. The inventory management device is connected to the network at 512. At 514, the user may save the network settings to connect another inventory management device to the network. At 516, the user may press the button on the inventory management device or mobile application to indicate if the container is the sole, local source for the material in the container or if there is additional material stored locally. At 518, the user may attach the inventory management device to the outer surface of the container.

FIG. 6 includes flow charts illustrating a method of inventory management of a plurality of containers having the inventory management device described herein. At 602, a user may view the status of each of the inventory management devices via the dashboard and/or mobile application. At 604, the user may edit inventory information, such as the name or ID of the container associated with the inventory management device and the material stored therein. The inventory information may be stored in the database. At 606, the user may delete the inventory information when the inventory management device is disconnected from the network to remove the respective ID from the map in the database.

At 608, each inventory management devices may displays its status as one of "empty" or "available" based on the main sensor 610 output. At 612, the inventory management devices may be programmed to check if the additional material is stored locally. Referring to FIG. 6B, at 614, the inventory management devices may be programmed to reorder the material when additional material is not available locally. Referring to FIG. 6C, at 618, the inventory management devices may be programmed to add the material to the refill list when additional material is available locally. At 618, the inventory management devices may be programmed to check if the additional material is stored locally. At 620, the inventory management devices may be programmed to list the container as the last refill when the material is not available locally. At 622, the inventory management devices may be programmed to list the container as "available" when the material is available locally.

FIG. 6B includes a flowchart illustrating a method of inventory management of a plurality of container having the inventory management device described herein that need reordering/purchasing. At 624, the inventory management system may be programmed to identify each of the containers having a level or quantify of material equal to or less than the ROP and identified as "last refill" by button 210 (see FIG. 2). At 626, the user may view the list of material in need of reordering/purchasing via the dashboard or mobile application. At 628, the user may manually add items to the list.

FIG. 6C includes a flowchart illustrating a method of inventory management of a plurality of containers having the inventory management device described herein that need refilling from material available locally. At 630, the inventory management system may be programmed to identify each of the container having a level or quantify of material equal to or less than the ROP and identified as "available" by button 210 (see to FIG. 2). At 632, the user may view the list of material in need of refiling from locally stored material via the dashboard or mobile application.

FIG. 6D includes a block diagram of the dashboard and/or mobile application. The inventory management system may be programmed to include recipes using one or more materials identified as "available" at 634, nutrition analysis of materials consumed at 636, product reviews at 638, materials to be refilled or reordered/purchased at 640, coupons for such materials to be reordered/purchased at 642, and/or purchase/subscription integration with online shopping merchants for materials to be reordered/purchased at 644 and nutrition analysis at 646.

FIG. 6E illustrates a block diagram of the dashboard and/or mobile application. At 650, a user may identify materials and sources for such materials. The inventory management system may be programmed to identify and list sources for the materials at 652. At 654, a GPS service on the user's mobile device may continuously track the user location. For example, when the user is proximate to a store having the material, the inventory management system may be programmed to notify the user to purchase the material from the store. At 656, once inside the store, the inventory management system may be programmed to identify the shortest route to the material in the dashboard using the store's latest arrangement information. At 658, upon checkout from the store, the user may scan the receipts or the purchased materials may be obtained directly through software integration with the store. The inventory management system may be programmed to store this data. This data may be used for correlation and analytics to provide consumers with recommendations for saving from grocery spend analysis and other financial analysis.

Referring to FIG. 7, illustrates a method of configuring and using the inventory management system. At 702, the user may affix the inventory management device having a unique identification, which may include a UPC code/MAC address, onto each container and powers on all the devices. The user may access the user interface, e.g., the mobile application, to receive the threshold level from a reference database and calibrates each of the devices via the hub. The threshold value may comprise a capacitance value and/or a time of return pulse, or a change in the capacitance value and/or time of return pulse. The time of return pulse may be calculated using program ticks. For example, the controller and/or the capacitance level sensor may transmit a pulse to measure the capacitance of the material. The time of return pulse when the material achieves the threshold amount may be different from the time of return pulse when the material is greater than the threshold amount. At 704, the number of containers at each location in the application may be inputted into the system by the user and/or may be automatically populated by the point of sale system. The user may input other mapping information, such as the product line for each unique identification, via the application that may be stored in the database. At 706, the device may be active, but in a sleep state, during transit to save power. During this time, the device may detect a tilt, fall, and/or vibration, or upon the expiration of a desired period to time and attempt to connect to the network. If the device cannot connect to the network, the device may return to the sleep state. At 708, when the device is delivered to the designated location, each storage unit automatically connects to the network via a hub or a smartphone without any user intervention. Upon detecting the first tilt, the device may connect to the hub and automatically being tracking and collecting product usage data. The hub may transmit the unique identification and updates to the server regarding the location of the device. At 710, when the device detects a tilt, the device may receive the signal from the vibration sensor, including the duration of the tilt, the number of tilts, and the unique device identification. This data may be encapsulated and stored in a packet. When the device connects to the hub, a handshake happens between the hub and each label. The handshake may occur at a pre-determined interval or every time a tilt is measured. The packet may be encapsulated in the device identifier (UUID or SSID) response that the hub uses to identify the device communication. This may be performed in the initial handshake itself to save power. At 712, the original user, e.g., the manufacturer or distributor, may be notified via the application that the amount of material in the container has achieved the threshold amount. At 714, the end user, e.g., a retailer or consumer, may input the minimum number of containers to be stored locally via the application. The end user may receive a notification when the number of containers stored locally achieves this minimum number. The end user may program the device to automatically reorder or require user approval to reorder. At 716, the process described above 702-714, may be repeated and the device may automatically update the server with the new number of containers that were reordered.

The method of configuring and using the inventory management system may comprise calibrating a plurality of inventory management devices based on the calibration of a single inventory management device that is based on the composition of material in the container, the composition of the container, and/or the wall thickness of the container. For example, the calibration information for an inventory management devices calibrated for a certain composition and container may be used to calibrate other inventory management devices for the same application.

After receiving the labels, the distillery may communicate with the labels via a hub to activate each label using an electrical switch, e.g., a reed switch, which connects the battery to the circuit to activate the label. The user may open the mobile application to connect to the server including the databases. The user may input the starting and ending label identifications as well as the product identification into the reference database. The server may transmit a calibration signal that is received by each of the labels. The calibration signal may include the threshold capacitance value. The deployment database may be updated automatically with the product identification from the reference database. The product identification may be associated with the distillery identification. The user may input the quantity of bottles allocated to each bar.

The inventory management system may be characterized by one or more of the following: small size, flexibility, reusability and nonintrusive monitoring of the quantity or level of material in the container. The small size and flexible inventory management system as described herein may comprise an electronic sticker on a flexible printed circuit board (PCB) or printed electronics. The reusable inventory management system as described herein may comprise the electronic sticker removeably attached to a container. The inventory management system may be attached to a container of any shape and size. The nonintrusive inventory management system as described herein may be safely used for food materials and medicines by surmounting the inventory management device to an exterior surface of the container. For example, the electronic sticker may be removed from a first container and attached to a second container. The inventory management system may be used to manage the inventory for a wide variety of substances. The inventory management system may be used to monitor the quantity or level of any material that achieves a stable state when stored in the container. The inventory management system may be configured to allow users to customize the ROP by positioning the inventory management device at the desired minimum material amount. The inventory management system may be automated when the container is configured onto the network.

The inventory management system may comprise an in-house power saving circuit such that the inventory management device lacks the need for frequent recharging. The inventory management system may be configured for a two-step inventory management process to list materials that need to be refilled from a local supply and reordered or purchased.

EXAMPLES

The inventory management devices and methods of use described herein may be better understood when read in conjunction with the following representative examples. In this example, a distillery may place an order for 500 labels to be used on 1 liter bottles of alcohol. The following examples are included for purposes of illustration and not limitation.

Example 1: Initial Setup of the Label

The label may be coupled to the bottle. The reference database may be updated to include a specific threshold capacitance value for the alcohol. The reference database may include the threshold capacitance value, name of the distillery, name of the product, first capacitance value (capacitance of the alcohol in the container) and second capacitance value (capacitance of an empty container, i.e., the capacitance of air in the container). The capacitance value may be converted into time of return pulse or program ticks. The deployment database may be updated as well. The deployment database may include a label identification, the name of the distillery, product identification, and reseller identification, e.g., the name of the bar selling the product. The label identification may include a UPC code. The label identification and distillery identification may be updated before shipping the labels.

Example 2: Calibration of the Label by the User

After receiving the labels, the distillery may communicate with the labels via a hub to activate each label using an electrical switch, e.g., a reed switch, which connects the battery to the circuit to activate the label. The user may open the mobile application to connect to the server including the databases. The user may input the starting and ending label identifications as well as the product identification into the reference database. The server may transmit a calibration signal that is received by each of the labels. The calibration signal may include the threshold capacitance value. The deployment database may be updated automatically with the product identification from the reference database. The product identification may be associated with the distillery identification. The user may input the quantity of bottles allocated to each bar.

Example 3: Transporting the Bottles to the End User

As described in the above examples, the labels may be activated by the user such that the labels are powered on but in a sleep state during transit to the bar. The power consumption may be reduced using one or more intelligent power saving strategies. For example, the label's controller may determine the period of time that the bottle is tilted. If this period of time is greater than a threshold value, e.g., 2 minutes, then the label may return to the sleep state. If this period of time is less than the threshold value, then the controller may transmit a signal to connect the label to a hub, and if the label cannot connect to the hub, the label may return to the sleep state.

Example 4: Use of the Inventory Management System by the End User

The hub at the bar may be configured to provide the network before the bottles arrive at the bar. The hub may transmit updated database information, including the location of the bar, from the server to the labels. As described above in Example 3, the labels may automatically connect to the network after the bottles are tilted. The end user may, but is not required to, connect the labels to the network. The end user may input the threshold number of bottles to trigger transmitting a reorder signal to the distillery to reorder the product. When this threshold number is achieved, the end user may be notified by the server that the automatic reorder was placed with the distillery by the system. Alternatively, the end user may be notified that the threshold number has been achieved so that the end user may place the reorder manually. The server may provide the distillery a map view showing the number of bottles remaining at each location.

Example 5: Collecting Data

When the label is connected to the network via the hub, the label may measure and/or transmit device identifier information ("UUID" or "SSID"), including the label identification, status (e.g., the amount of material in the container), number of tilts, and duration of each tilt during the initial setup and/or when the label measures a tilt. At a predetermined time, such as each hour, the hub may transmit a signal to wake up each label causing each label to transmit the UUID. The hub may store the UUID. The hub may transmit the UUID to the server. The server may store the UUID. When the amount of material in the container achieves the threshold amount, a status of 0 is received by the hub at the bar and a notification is sent to the distillery and updates the database.

Example 6: Deactivating the Label

The label may transmit a signal to be received by the database to cause the label to be deactivated in the database. For example, the signal sent to the distillery to provide notice of the reorder may also deactivate the label in the database. Any information collected and/or transmitted by a deactivated label may be would be considered invalid. This may reduce the likelihood of the bottle from being reused by the end user. The end user may remove the deactivated label from the bottle. After a reorder has been received by the distillery, the user may begin again at Example 1 to reconfigure a new set of labels on the bottles to be delivered to this bar. When the new set of bottles is received by the bar, the each new label may automatically connect to the network as described above.

Each of the characteristics and examples described above, and combinations thereof, may be said to be encompassed by the present invention. The present invention is thus drawn to the following non-limiting aspects:

(1) An inventory management device to monitor an amount of a material in a container, the device comprising: a capacitive level sensor to measure a first capacitance value and a second capacitance value; a vibration sensor in electronic communication with the capacitive level sensor to generate a vibration signal that corresponds to a vibration of the container; a storage unit in electronic communication with the capacitive level sensor to store the first capacitance value; a controller in electronic communication with the capacitive level sensor and storage unit to measure a change in the capacitance between the first capacitance value and second capacitance value; a transmitter in electronic communication with the controller to transmit an output signal when the controller measures the change in capacitance; and a flexible battery to power the capacitive level sensor, vibration sensor, storage unit, controller, and transmitter; wherein the inventory management device has a thickness less than 1 mm.

(2) The device according to aspect 1, wherein the capacitive level sensor measures the first capacitance value when the amount of the material in the container is greater than a threshold amount of material in the container.

(3) The device of according to aspects 1 or 2, wherein the capacitive level sensor measures the second capacitance value when the amount of the material in the container is less than or equal to a threshold amount of material in the container.

(4) The device according to aspects 1-3, wherein the change in capacitance indicates the amount of material in the container is less than or equal to a threshold amount of material in the container.

(5) The device according to aspects 1-4, wherein the material does not contact the capacitive level sensor.

(6) The device according to aspects 1-5, when the controller receives the vibration signal, the capacitive level sensor measures the second capacitance value and the transmitter transmits the output signal.

(7) The device according to aspects 1-6, when the controller receives the vibration signal, the capacitive level sensor measures the second capacitance value, the storage unit stores the second capacitance value, and the transmitter transmits the output signal upon the expiration of a delay period.

(8) The device according to aspects 1-7, when the controller receives the vibration signal, the capacitive level sensor measures the second capacitance value, and the transmitter transmits the output signal when the controller measures a change in the capacitance between the first capacitance value and second capacitance value.

(9) The device according to aspects 1-8, wherein the controller changes from a sleep state to an active state upon receiving the vibration signal, and returns to the sleep state after the output signal is transmitted.

(10) The device according to aspects 1-9, comprising a timer in electronic communication with the controller to start a delay period when the controller receives the vibration signal and transmit a signal to the controller upon expiration of the delay period.

(11) The device according to aspects 1-11, wherein the timer measures a vibration period comprising the duration of the vibration when the material is dispensed from the container, and the storage unit stores the vibration period.

(12) The device according to aspects 1-12, wherein the controller is programmed to collect inventory information comprising one or more of a timestamp of each vibration and/or when the material achieves the ROP, location of the container, an unique identification of the device, and a rate of consumption of the material.

(13) The device according to aspects 1-12 comprising an interface comprising a dashboard in electronic communication with the controller to allow a user to enter self-reported inventory information and correlate the self-reported inventory information with the inventory information collected by the controller.

(14) A system to maintain an inventory of a material, the system comprising: at least one container comprising an amount of material; a battery powered inventory management device having a thickness less than 1 mm and removeably coupled to an exterior surface of the at least one container, the device comprising a capacitive level sensor to measure a first capacitance value and a second capacitance value, a vibration sensor in electronic communication with the capacitive level sensor to generate a vibration signal that corresponds to a vibration of the container, a timer in electronic communication with the controller to start a vibration period when the controller receives the vibration signal and transmit a signal to the controller upon expiration of the vibration period, a storage unit in electronic communication with the capacitive level sensor to store the first capacitance value and vibration period, a controller in electronic communication with the capacitive level sensor and storage unit to measure a change in the capacitance between the first capacitance value and second capacitance value, a transmitter in electronic communication with the controller to transmit an output signal when the controller measures the change in capacitance, and a flexible battery to power the capacitive level sensor, vibration sensor, timer, storage unit, controller, and transmitter, and a server in electronic communication with the inventory management device to receive the output signal and automatically communicate the output signal to at least of a user and a vendor to effect automatic ordering of the material when the amount of material in the container is equal to or less than a threshold amount; and wherein a change in capacitance between the first capacitance value and the second capacitance value indicates the amount of material in the container is less than or equal to a threshold amount of material in the container.

(15) The system according to aspect 14 comprising a plurality of the containers each having the battery powered inventory management device removeably coupled to the exterior surface thereof, wherein the server is in electronic communication with each of the inventory management devices, and wherein the first capacitance value of each of the devices is the same.

(16) A method of detecting an amount of a material in a container having a battery powered inventory management device having a thickness less than 1 mm and removeably coupled to an exterior surface of the container, the method comprising: determining an amount of material in the container; detecting at least one vibration of the container when the material is dispensed from the container; measuring a change in the capacitance between a first capacitance value and a second capacitance value; determining the amount of material in the container is equal to or less than a second amount of material in the container based on the change in the capacitance; wherein the first capacitance value is detected when the amount of the material in the container is greater than a threshold amount of material in the container; and wherein the second capacitance value is detected when the amount of the material in the container is less than or equal to the threshold amount of material in the container.

(17) The method according to aspect 16 comprising: detecting a change in the amount of material in the container based on a difference between the first amount and the second amount; and determining an average amount of material dispensed from the container based on a quotient of the change in the amount of material in the container and a sum of the at least one vibration of the container when the material is dispensed from the container.

(18) The method according to aspect 16 or 17 comprising: collecting inventory information comprising one or more of a timestamp of each vibration and/or when the material achieves the ROP, location of the container, an unique identification of the device, and a rate of consumption of the material; and automatically communicating the inventory information to effect automatic ordering of the material when the amount of material in the container is equal to or less than the threshold amount.

(19) The method according to aspects 16-18 comprising, after detecting a vibration of the container, triggering a start of a delay period; generating an internal power supply voltage to power a transmitter of the inventory management device to communicate the inventory information upon expiration of the delay period.

(20) The method according to aspects 16-19 comprising, based on the inventory information: generating a list of materials to be reordered from a vendor when the amount of the material in the container is less than or equal to the threshold amount and no local supply of the material is available; generating a list of materials to be restocked from a local supply when the amount of the material in the container is less than or equal to the threshold amount and a local supply of the material is available; and generating a list of the at least one container having greater than the threshold amount and having less than or equal to the threshold amount.

(21) The method according to aspects 16-20 comprising, wherein generating a list comprises comparing an actual inventory to a desired inventory.

(22) The method according to aspects 16-21, wherein automatically communicating the inventory information comprises transmitting the inventory information to a vendor.

(23) The method according to aspects 16-22 comprising determining an identification of the container based on the inventory information.

While particular embodiments of inventory management devices have been illustrated and described, it would be obvious to those skilled in the art that various other changes and modifications can be made without departing from the spirit and scope of the invention. Those skilled in the art will recognize, or be able to ascertain using no more than routine experimentation, numerous equivalents to the specific devices, systems, and methods described herein, including alternatives, variants, additions, deletions, modifications and substitutions. This application including the appended claims is therefore intended to cover all such changes and modifications that are within the scope of this application.

What is claimed is:

1. An inventory management device to monitor an amount of a material in a container, the device comprising:
   a capacitive level sensor to measure a first capacitance value of the material in the container and the container and a second capacitance value of the container;
   a vibration sensor in electronic communication with the capacitive level sensor to generate a vibration signal that corresponds to a vibration of the container;
   a storage unit in electronic communication with the capacitive level sensor to store the first capacitance value;
   a controller in electronic communication with the capacitive level sensor and storage unit to measure a change in the capacitance between the first capacitance value and second capacitance value;
   a transmitter in electronic communication with the controller to transmit an output signal when the controller measures the change in capacitance; and
   a flexible battery to power the capacitive level sensor, vibration sensor, storage unit, controller, and transmitter;
   wherein the inventory management device has a thickness less than 1 mm.

2. The device of claim 1, wherein the capacitive level sensor measures the first capacitance value when the amount of the material in the container is greater than a threshold amount of material in the container.

3. The device of claim 1, wherein the capacitive level sensor measures the second capacitance value when the amount of the material in the container is less than or equal to a threshold amount of material in the container.

4. The device of claim 1, wherein the change in capacitance indicates the amount of material in the container is less than or equal to a threshold amount of material in the container.

5. The device of claim 1, wherein the material does not contact the capacitive level sensor.

6. The device of claim 1, when the controller receives the vibration signal, the capacitive level sensor measures the second capacitance value and the transmitter transmits the output signal.

7. The device of claim 1, when the controller receives the vibration signal, the capacitive level sensor measures the second capacitance value, the storage unit stores the second capacitance value, and the transmitter transmits the output signal upon the expiration of a delay period.

8. The device of claim 1, when the controller receives the vibration signal, the capacitive level sensor measures the second capacitance value, and the transmitter transmits the output signal when the controller measures a change in the capacitance between the first capacitance value and second capacitance value.

9. The device of claim 6, wherein the controller changes from a sleep state to an active state upon receiving the vibration signal, and returns to the sleep state after the output signal is transmitted.

10. The device of claim 1, comprising a timer in electronic communication with the controller to start a delay period when the controller receives the vibration signal and transmit a signal to the controller upon expiration of the delay period.

11. The device of claim 10, wherein the timer measures a vibration period comprising the duration of the vibration when the material is dispensed from the container, and the storage unit stores the vibration period.

12. The device of claim 1, wherein the controller is programmed to collect inventory information comprising one or more of a timestamp of each vibration, when the material achieves a reorder point (ROP), a location of the container, an unique identification of the device, and a rate of consumption of the material.

13. The device of claim 12 comprising an interface comprising a dashboard in electronic communication with the controller to allow a user to enter self-reported inventory information and correlate the self-reported inventory information with the inventory information collected by the controller.

* * * * *